United States Patent

[11] 3,593,400

| [72] | Inventors | Donald L. Geiselman;<br>Frederick T. Newell, both of Bradford, Pa. |
|---|---|---|
| [21] | Appl. No. | 862,577 |
| [22] | Filed | Aug. 18, 1969 |
| [45] | Patented | July 20, 1971 |
| [73] | Assignee | Dresser Industries, Inc.,<br>Dallas, Tex.<br>Continuation-in-part of application Ser. No. 604,090, Oct. 31, 1966, now Patent No. 3,420,500, Original application Apr. 17, 1967, Ser. No. 631,255, now Patent No. 3,525,499. |

[54] METHOD OF FORMING A BUTTERFLY VALVE
6 Claims, 9 Drawing Figs.

[52] U.S. Cl. ................................................. 29/157.1 R,
29/156.7 A, 29/527.6, 29/DIG. 8, 164/99
[51] Int. Cl. ...................................................... B23p 15/26,
B23p 17/00, B23k 19/00
[50] Field of Search ........................................... 251/306;
29/157.1 R, 156.7 A, DIG. 5, DIG. 8, 527.6;
164/95, 98, 99

[56] References Cited
UNITED STATES PATENTS

| 316,588 | 4/1885 | Weber | 251/328 |
|---|---|---|---|
| 2,586,927 | 2/1952 | Fantz | 251/306 |
| 3,271,845 | 9/1966 | Brehen | 29/157.1 |
| 3,502,299 | 3/1970 | Phillips | 251/306 |

FOREIGN PATENTS

| 535,731 | 12/1929 | Germany | |

Primary Examiner—John F. Campbell
Assistant Examiner—D. C. Reiley
Attorneys—Robert W. Meyer, Daniel Rubin, Peter J. Murphy, Roy L. Van Winkle and William E. Johnson, Jr.

ABSTRACT: A butterfly valve in which the seat is formed of a stainless steel ring fused to the valve body by casting the body about the prepositioned ring prior to the finished machining thereof.

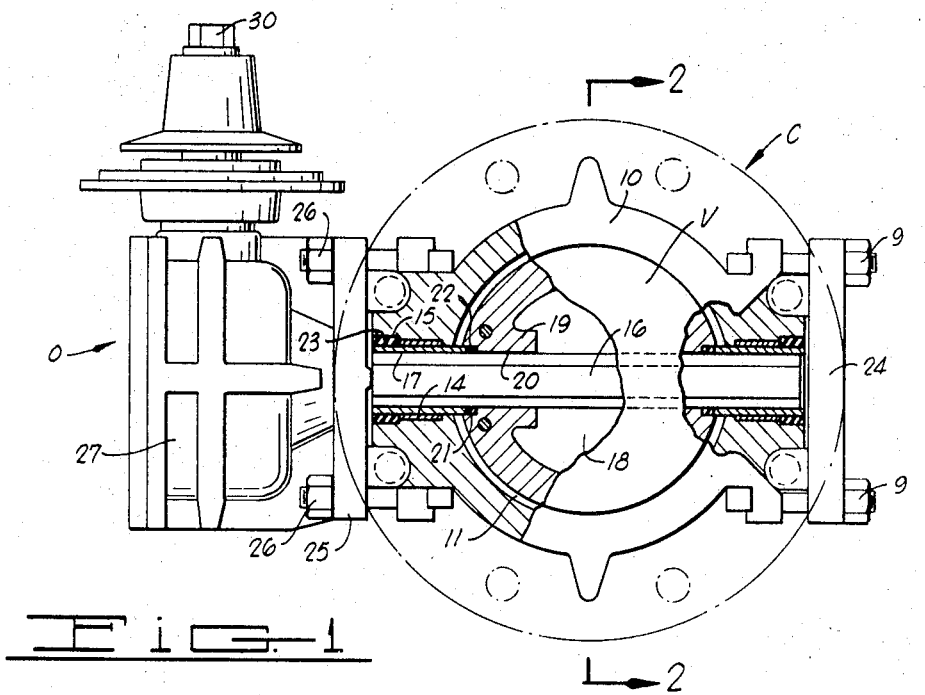
Fig. 1
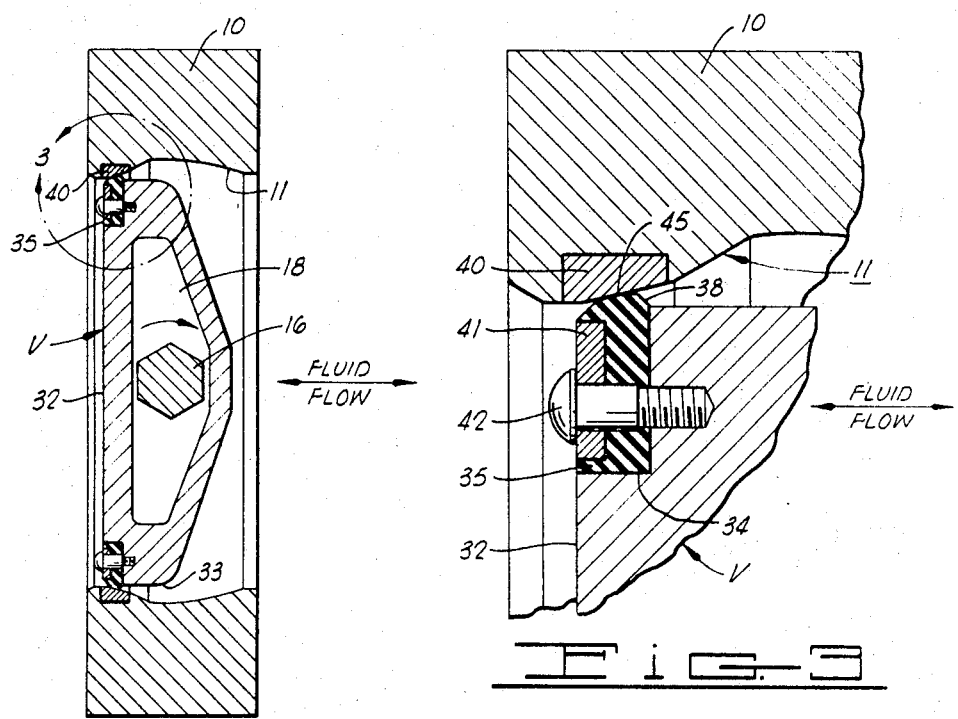
Fig. 2
Fig. 3
INVENTORS
DONALD L. GEISELMAN &
FREDERICK T. NEWELL
BY Daniel Rubin
ATTORNEY

INVENTORS
DONALD L. GEISELMAN &
FREDERICK T. NEWELL
BY

ATTORNEY 3,593,400

METHOD OF FORMING A BUTTERFLY VALVE

This application is a continuation-in-part of application Ser. No. 604,090, filed Oct. 31, 1966 now patent no. 3,420,500, and entitled OPERATING MECHANISM FOR BUTTERFLY VALVE and is a division of application Ser. No. 631,225, filed Apr. 17, 1967 now Pat. No. 3,525,499.

1. Background of the Invention

The field of art to which the invention pertains includes "Valves and Valve Actuation" as contained in Patent Office class 251.

2. Description of the Prior Art

The prior art to which the invention is directed includes the art of butterfly valves being of a type in which a usually circular vane or disc is rotatable in the valve passage between an open and closed position. When in the closed position, the vane engages a seat with which it cooperates to provide a seal against leakage of the pressurized line contents intended to be controlled by the valve. It is essential in valves of this type that the seal be effective on each occasion of valve closing for the life of the valve to continuously provide positive shut off without frequent maintenance and servicing of the seat. Because the seat is commonly subjected to wearing conditions caused by factors such as wire drawing, corrosion, temperature changes, abrasions and the like, it is desirable to provide an ideal seat which is completely unaffected by these factors. Accordingly, it has long been recognized that the seat should comprise a hard, durable corrosion-resistant material able to at least substantially retain its machine-finished surface to withstand normal and conventional conditions and provide trouble-free service for very prolonged operating periods. Previous efforts to achieve this result have included the use of premachined alloyed materials for the seat placed into the valve body as a production step subsequent to the casting of the valve body by cementing or the like. This has achieved only a limited success for a short time following manufacture because of the inability of the cement to maintain its bond for the life of the valve. Leakage occurs as the bond, affected by the conditions of use, begins to fail, frequently after only a short time period of operative service. At the same time, it had not been known to fuse a suitable seat material into the valve body during casting of the latter since the difference in expansion coefficients between the body and seat materials has heretofore caused the ring to separate from the valve body occasioned by the difference in shrinkage during the cooldown after casting.

SUMMARY OF THE INVENTION

This invention relates to valves and to the process of their manufacture. More particularly, the invention relates to butterfly valves and the process of producing butterfly valves in which a valve seat of hard, durable corrosion-resistant material is fused to the valve body by casting the body about a preformed seat ring prior to the finished machining thereof. In accordance with the invention, it has been discovered that a ring such as an austenitic stainless steel when supported on the mold core while the molten body material is poured in a conventional manner, will, after cooling, be contained firmly fused to the body. By the techniques hereof, the previous problem of ring separation occasioned by the different shrinkages between the body and ring is reproducibly overcome by employing critically discovered geometric parameters of the ring in relation to its fusing length in bond with the body. Hence, there has now been discovered for the first time how a material such as an austenitic stainless steel can be successfully fused to a cast iron valve body without the attendant difficulties that have existed in prior art devices as noted above to result in a more trouble-free valve of greater reliability with reduced maintenance requirements than heretofore. While specifically useful in connection with valves of the butterfly type, the techniques in accordance with the invention can likewise be employed in the manufacture of other valve types such as gate valves, plug valves, ball valves or the like in which it is customary to have a seat engaged by a closure member.

It is therefore an object of the invention to provide a valve having a superior seat construction than heretofore.

It is a further object of the invention to provide a novel process for the manufacture of valves whereby a durable, corrosion-resistant seat ring material such as stainless steel having an expansion coefficient greater than a valve body such as cast iron can be fused to the valve body by casting the body about the seat ring.

It is a still further object of the invention to provide improved butterfly valves in which the attendant problems heretofore as associated with the seat ring in the valve body are overcome economically and reliably.

Further objects, advantages and details will become apparent from the following description when read in conjunction with the accompanying drawings, in which:

FIG. 1 is a plan sectional view of a butterfly valve with parts partially broken away;

FIG. 2 is a sectional view taken substantially along the lines 2-2 of FIG. 1;

FIG. 3 is an enlarged view of the seat-engaging surfaces encircled in FIG. 2;

Figure 4:
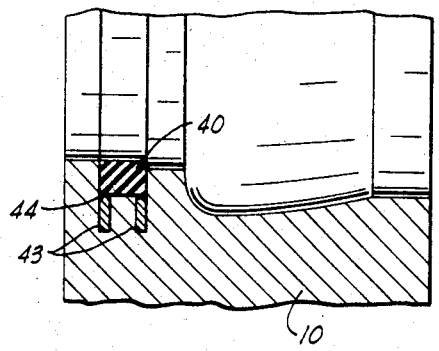
FIGS. 4 and 5 are partial sections illustrating typical seat rings in their unfinished state in the valve body in accordance herewith; and, FIG. 6 is a fragmentary view illustrating typical dimensional parameters before finish machining of the seat ring in relation to the valve body in accordance herewith.

Referring now to FIG. 1, there is illustrated an embodiment in the form of a butterfly valve as disclosed in the parent application hereof. The valve includes a housing or casing referred to generally by the reference character "C" having an annular wall 10 to which is secured a seat generally referred to as 11 and formed in accordance with the invention as will be described below. At diametrically opposite points with respect to the seat, the wall 10 includes aligned cylindrical bores 13 sized to accommodate Teflon or the like antifriction bearing sleeves 14 and enlarged at their outer ends to provide counterbores 15. The main valve cross-shaft is designated 16 and is of a noncircular formation throughout its length. Carried by the ends of shaft 16 within the bores 13 are corrosion-resistant bearing sleeves 17, preferably of a corrosion proof material such as stainless steel. The sleeves each have a noncircular central bore corresponding to the shape of the shaft 16 to receive and complement the shaft therethrough as to constitute the driving connection between the shaft and the bearing sleeve. The outer surface of the sleeve is cylindrical and is journaled within the Teflon sleeve 14.

The vane, as can be seen also in FIG. 2, is referred to in its entirety by the reference character "V", It includes a central cavity 18 through which the shaft 16 passes and is formed with an internal hub 19. The hubs in turn are formed with noncircular bores 20 corresponding to the cross section of the shaft 16 received therein to establish a driving connection between the shaft and vane member.

At the outer end of each bore 20, there is included a counterbore 21 partially receiving the bearing sleeve 17 and a static seal 22 likewise fitted therein. Positioned in each counterbore 15 is an outer seal 23, which generally comprises rubber or other suitable elastomeric material, to prevent leakage of fluid from the interior of the housing. At one side, the seal is held in position by a cover plate 24 which is secured to the housing by means of bolts 9. The seal 23 on the other side is held in position in a similar manner by a base plate 25 associated with the valve-operating mechanism and secured to the housing by bolts 26.

Mounted on the base plate 25 is a housing 27 for the valve-operating mechanism generally designated as "O." This latter housing defines a chamber in which the vane shaft 16 is received through base plate 25 for operatively opening and closing the valve via a wrench-engaging member 30 all as more fully described in the parent application hereof.

The vane and seat construction with which the invention hereof is concerned can be more readily understood with reference now to FIGS. 2 and 3. As thereshown, the vane V includes a face 32, a generally circular periphery 33 and a notchlike recess 34 at its peripheral corner in which is secured a rubber-or other suitable-type gasket 35. The gasket has an outer rounded or beveled edge 38 which when the vane is in closed position engages seat ring 40 of seat 11 formed in accordance with the invention hereof and shown post-machined in a completed valve with a ground seat surface 45. A clamp means in the form of a ring 41 embeds against the backface of the gasket and a screw 42 passes through aligned openings to secure the gasket to the vane.

While materials such as monel, bronze, or alloy cast iron ASTM A-436 and ductile iron, or steel can be utilized for the ring and body respectively, in the preferred embodiment the ring 40 is of an austenitic stainless steel of a commercially available grade such as 303, 304 or 316 while the valve body 10 comprises a cast iron of commercial grades such as A 126 or A 48. With these materials, the ring and body have thermal coefficients of expansion respectively of approximately $9.6 \times 10^{16}$ and $6.0 \times 10^{16}$ inches per inch per degree F. with melting points respectively of approximately 2550° F. and 2100° F. This requires casting of the molten iron at a temperature well within the range differential of the melting points and in accordance herewith, conventional casting techniques of a core supported ring are employed, per se forming no part of this invention. However to overcome the tendency to separate between ring and body occasioned by their different shrink rates on cooldown, critical geometrical parameters are selected of the ring. When these parameters are employed, a positive fusing bond results despite and notwithstanding the existing differences in shrinkage by virtue of their respective different thermal expansion coefficients. By means thereof, the formed bond even during cooldown is sufficient to restrain the ring against shrinkage different than the body as to not produce even a partial separation which can be detected anywhere about its cross-sectional parameter.

Figure 5:
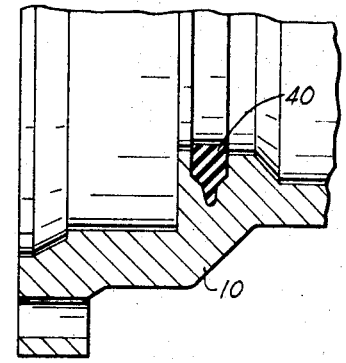

As can be seen in FIGS. 4 and 5, ring 40 and valve body 10 are shown in their postcooled state before finish machining of the ring. While the cross-sectional configuration or shape of the ring is per se not critical to the invention hereof, it is important and critical to the extent that the line length of bonding contact extending peripherally about the ring at the valve body at least equals or exceeds a predetermined ratio to the cross-sectional area thereof. This relationship, which is defined herein in "inch" units, can be expressed in equivalent units by application of an appropriate factor and has been found to be at least a 4.5 inch/inch². In other words, the feature which has been found critical to enable the permanent bonding despite the difference in shrinkage rates between ring and body is the minimum ratio of cross-sectional ring fusing length in contact with the valve body in proportion to the cross-sectional area of the ring determined to be at least 4.5 inch/inch². As will be understood from the sample computations below, various geometries can be employed to achieve this result. Also where because of the valve size, as on the order of 48-inch and above, it becomes economically impractical to develop the required geometry with a single metal or alloyed seat material 40, other integrally attached metals or alloys can optionally be partially substituted. Such a construction is illustrated in FIG. 4 in which annular legs 43 of a carbon steel bar are welded to the stainless ring 40 at 44 to extend radially outward into the body and enable achievement of the required ratio. Carbon steel bars of this type have thermal expansion coefficients of from about the same as cast iron to about $8.6 \times 10^{16}$. By this latter means, the fusing length is increased without increasing the cross-sectional area of ring 40.

By reference now to the various geometric configurations illustrated in FIGS. 6 A—D, computation of the critical ratio will be further explained.

Figure 6A:
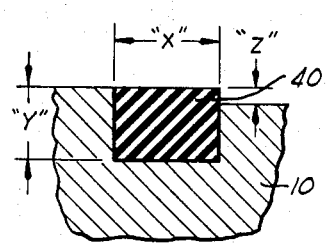
Figure 6B:
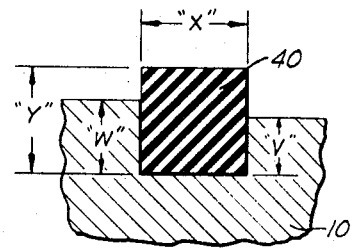
Figure 6C:
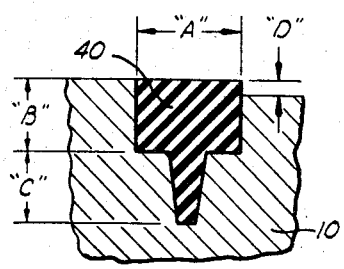
Figure 6D:
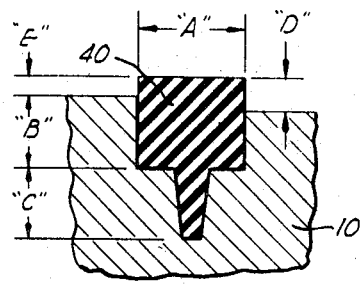

Looking first at FIG. 6A where X=12 inches; Y=3/8 inch; and Z=1/16 inch there results a ratio of 6.3 inch/inch². For the variations shown in FIG. 6B where X=½ inch; Y=17/32 inch; W=⅜ inch; and V=5/16 inch there is produced a ratio of 4.5 inch/inch². In FIG. 6C where A=¾ inch; B and C=⅛ inch; and D=1/16 inch produces a ratio of 6.1 inch/inch². With the arrangement of FIG. 6D where A=3/4 inch; B=9/16 inch; C=½ inch; D=3/16 inch; and E=⅛ inch produces a ratio of 4.87 inch/inch². These illustrative dimensional values are of course to be regarded as typical and not as a limitation with respect to the geometry of ring cross section which can be employed since obviously many known geometries can be selected to meet this ratio. It is also to be remembered that these illustrative calculations refer to the relationships as they exist after casting but before finish machining of the ring. Whereas it can be expected that this ratio in the finished product will be varied by reason of further machining of the ring surface to form face 45, the reduction in cross-sectional area is usually proportionately greater than the affected fusing perimeter to increase rather than decrease the ratio in the finished product. While the ratio of 4.5 inch/inch² has been established as a critical minimum necessary to effect the proper fusing in accordance herewith, ratios on the order of 6.3 inch/inch² and above are to be preferred to allow for eccentricities or other imperfections which may be encountered.

Since many changes could be made in the above construction and many apparently widely different embodiments of this invention could be made without departing from the scope thereof, it is intended that all matter contained in the drawings and specification shall be interpreted as illustrative and not in a limiting sense.

We claim:

1. In the method of forming a valve, the improvement including the step of cast fusing a valve body onto a seat-forming material different than said body, said seat-forming material having a coefficient of thermal expansion on at least the seat-forming portion thereof greater than said body to be fused into contact therewith in a generally tension relation at the area of contact, the perimeter cross-sectional fusing length of the entire seat material when fused to the cast body being proportional to its entire cross-sectional area in the ratio of at least 4.5 inch/inch².

2. The improvement according to claim 1 in which the entire seat-forming material has a melting temperature in excess of said body material.

3. The improvement according to claim 2 in which the coefficient of thermal expansion of at least the seat-forming portion of said seat material is at least approximately 50 percent greater than that of the body material.

4. The improvement according to claim 3 in which the seat-forming material is comprised of a single metal alloy substantially in its entirety.

5. The improvement according to claim 3 in which the valve body is comprised of cast iron and the seat material in at least the seat-forming portion thereof is comprised of an austenitic stainless steel.

6. The improvement according to claim 5 including the additional step of machining the fused seat material to form a seating surface for a butterfly valve and by which the said ratio is increased as compared to the ratio after casting.